May 30, 1961  W. T. COX  2,986,102
RAIL CONVERSION MECHANISM FOR AUTOMOBILES
Filed Jan. 2, 1959  2 Sheets-Sheet 1
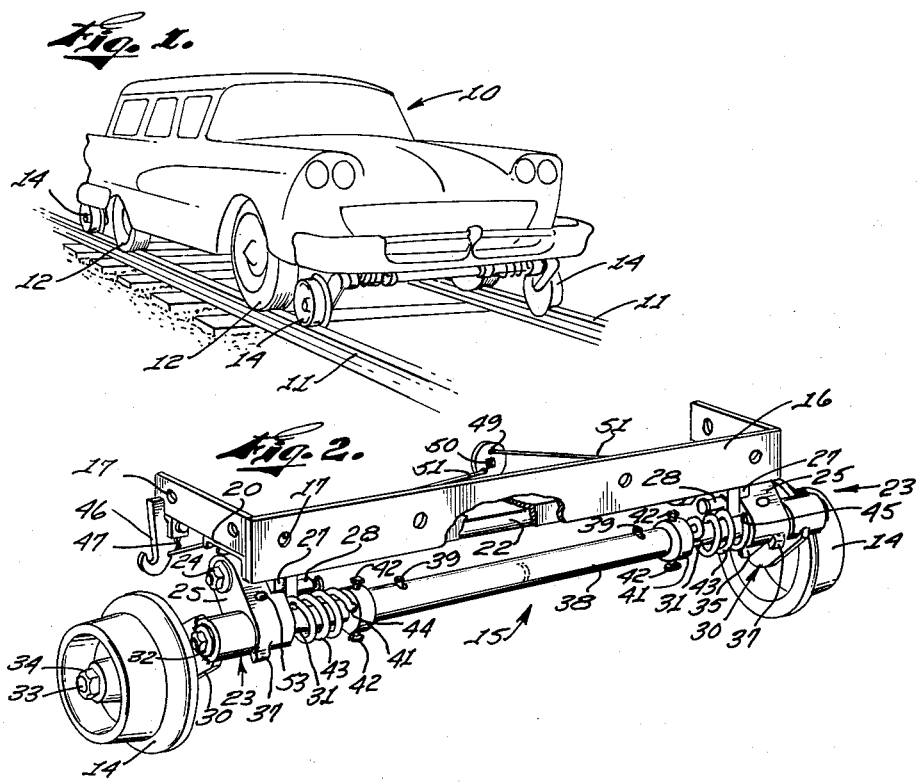
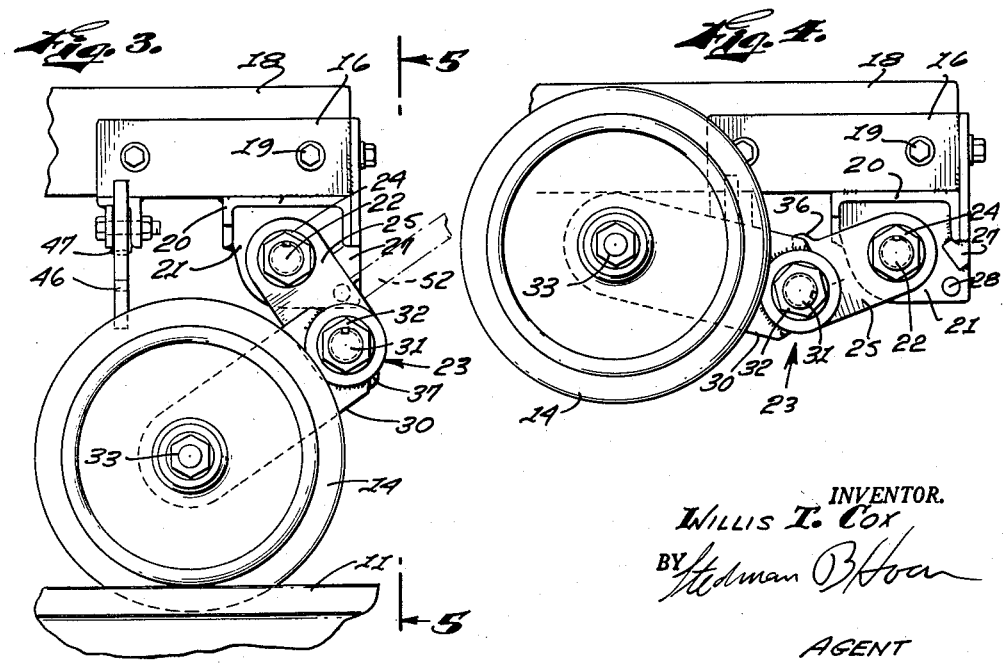
INVENTOR.
WILLIS T. COX
BY
AGENT

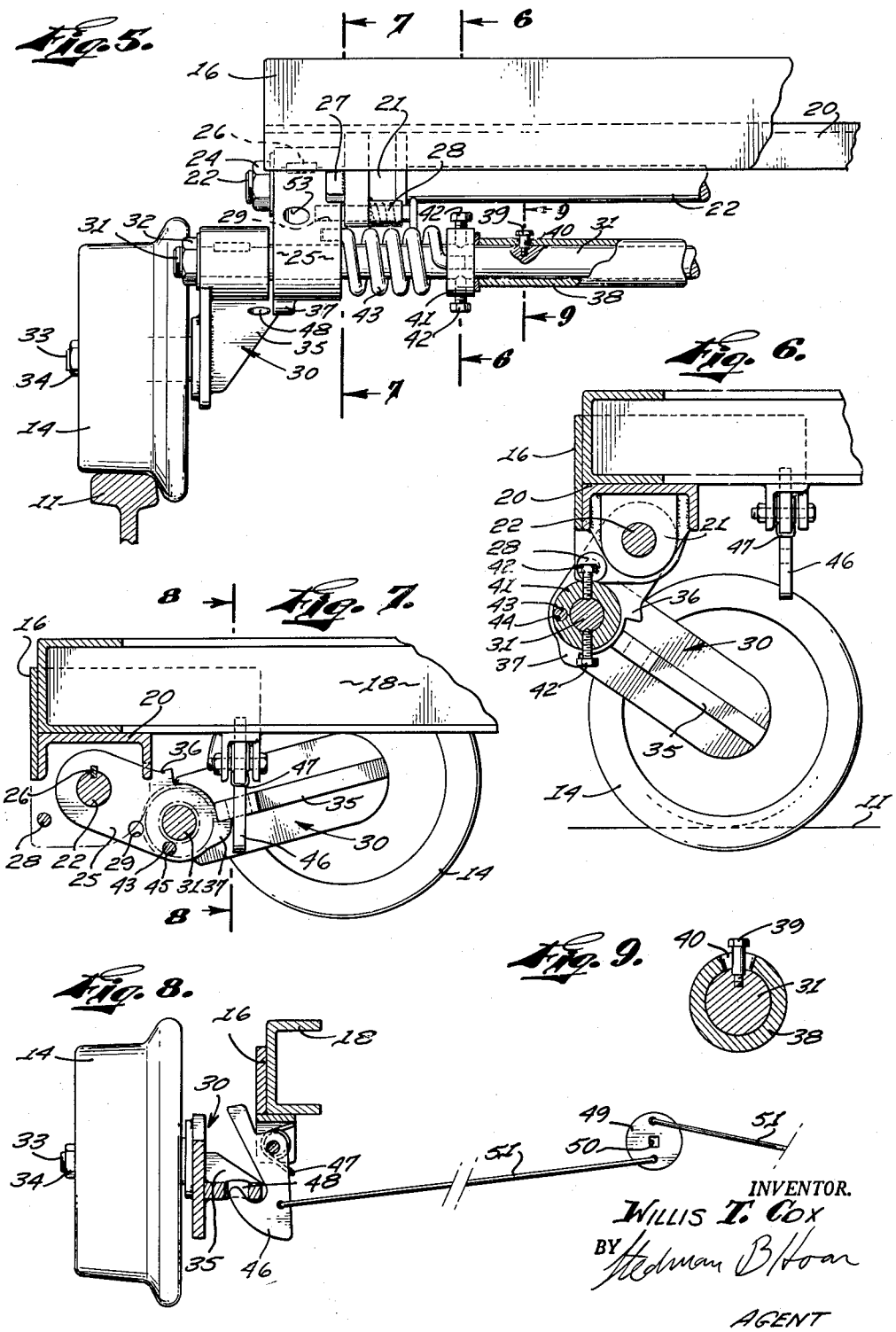

United States Patent Office 2,986,102
Patented May 30, 1961

2,986,102
RAIL CONVERSION MECHANISM FOR AUTOMOBILES

Willis T. Cox, 1021 Fruit St., Santa Ana, Calif.

Filed Jan. 2, 1959, Ser. No. 784,584

6 Claims. (Cl. 105—215)

This invention relates to a conversion mechanism for automobiles whereby an automobile is enabled to run upon rails like a railroad car or trolley car.

Conversion mechanisms of this general type have been in use for many years but have never become popular or even practical. A particular use for such systems is in connection with the automobile of a rail inspector for a railroad. Yet even for such practical and everyday uses, inspectors still employ small cars or carts which can not be used away from the railroad but which are operated by a gasoline motor or pushed in front of a locomotive. It appears that the principal difficulty has heretofore been in the quick conversion from a rail vehicle to a road vehicle and vice versa.

It is an object of my invention to provide a vehicle which may be used both on highways and on rails.

A further object of my invention is to provide a self-contained vehicle which is rapidly and easily convertible from a highway vehicle to a rail vehicle and back again to a highway vehicle.

Still another object of my invention is to provide a rail conversion mechanism which may be attached to an automobile and which will then enable the automobile to run upon rails, giving to the occupants of the automobile all the comforts of the modern motor vehicle instead of the discomforts of the usual rail hand car. A further object is to provide a rail conversion made in two units, one for the front of an automobile and the other for the rear, so that the weight to be handled at any instant is within the capabilities of an individual.

Another object of my invention is to provide forward and rearward units which, except for the necessary adapters to secure them to automobile frames of differing designs, are alike in their major details, so that the manufacturing costs may be kept to a minimum.

A further object of my invention to provide a conversion mechanism having flanged wheels suspended by a folding mechanism having an arm-like action whereby a very considerable leverage with a very short vertical movement of the wheels, may be obtained.

Another object of my invention is to provide a spring-suspension for the flanged wheels which may be adjusted to give a predetermined pre-loading just sufficient to permit the flanged wheels to stay upon the rails while the rubber-tired wheels supply the traction.

Still another object of my invention is to provide a rail conversion unit of simple and inexpensive design which, by the use of suitable adapters, may be used on automobiles of nearly all makes, and—again by the use of adapters—on either the forward or rearward ends of such automobiles.

The invention includes rail-type wheels mounted in pairs on axles which may be used on either end of a vehicle, the wheels having elbow-action connections to the axles and being retractable from their rail-contacting positions to elevated positions in which they are out of contact with the ground when the vehicle is driven on a highway. The invention further includes spring-loading the rail-type wheels to force them into contact with the rails on which they run, to insure that the vehicle follows the track, nevertheless permitting the bulk of the weight of the vehicle to continue to be supported by the usual vehicular wheels, whereby traction on the rails is maintained to drive the vehicle, and furthermore permitting the wheels to be easily retracted. The invention further includes split axles permitting individual spring action of the wheels. The invention further includes the combination of units of wheels and axles as above and hereinafter described, with adapters to enable the units to be used with automotive vehicles of differing types and models. For example, as herein illustrated and described the invention is shown in use with a late-model station wagon, but is equally adaptable to other models.

In the accompanying drawings, illustrative of a presently preferred embodiment of my invention but not to be taken as limiting, Fig. 1 is a perspective view of an automobile with my rail conversion mechanism attached and in position to run upon rails;

Fig. 2 is a perspective view of an enlarged scale of one of the two rail conversion units, which might be either the forward unit as seen in Fig. 1, or a view from the left rear corner of the vehicle of Fig. 1, looking forward;

Fig. 3 is a fragmentary side elevation, from the left of Fig. 2, and on a further enlarged scale, with the rail wheel lowered upon a rail;

Fig. 4 is a view similar to Fig. 3 but showing the rail wheel retracted to road-travelling position;

Fig. 5 is a fragmentary end elevational view from the viewpoint of the line 5—5 of Fig. 3, with axle parts shown broken away;

Fig. 6 is a sectional view on the line 6—6 of Fig. 5, showing the rail wheel lowered as in Fig. 3, the view being from between wheels, looking outward;

Fig. 7 is another sectional view on the line 7—7 of Fig. 5, again looking outward, but showing the wheel retracted as in Fig. 4;

Fig. 8 is a sectional view on the line 8—8 of Fig. 7, showing details of the hook mechanism which holds the wheel in retracted position; and Fig. 9 is a sectional view on the line 9—9 of Fig. 5, showing construction of the split axle.

Having reference now to the details of the drawings, I have shown in Fig. 1 a vehicle 10 of the station-wagon type, borne upon rails 11. The vehicle 10 has the usual rubber-tired wheels 12 which might, if the vehicle were four-wheel drive, all provide traction on the rails 11, but which in most instances will propel the vehicle only through the rear wheels 12, the front wheels merely supporting a part of the weight of the vehicle and not even steering while the vehicle is on the rails. Also engaging the rails 11 are flanged wheels 14, arranged in forward and rearward pairs, with each pair being part of a complete unit 15, normally left attached to the vehicle but detachable therefrom if so desired, and better illustrated in Fig. 2.

The units 15 are alike except for the adapter frames 16 by which they are secured to the vehicle 10, and only one unit will be herein described. The adapter frames 16 may be of any design to suit any particular vehicle, and for the purpose of illustration a frame 16 is shown as a plain rectangular bracket provided with bolt-holes 17 by which it may be secured to the vehicle chassis 18 by bolts 19. A channel iron 20 is secured, as by welding, to the under side of the frame 16 and provides bearings 21 in which a transverse axle 22 turns.

Jointed arm-like members 23 are secured to the ends of the axle 22 by nuts 24, to pivot in vertical planes. The proximal portions 25 of the members 23 are keyed to the axle 22 by keys 26, so that the axle turns and both the portions 25 swing as one piece. Stops 27 welded or otherwise secured to the adapter frame 16, limit the swing of the portions 25 outwardly from under the vehicle 10. At the outward limit imposed by the stops 27, spring bolts 28 on the frame 16 come into register with and may enter holes 29 in the proximal portions 25, thereby securing the proximal portions 25, the axle 22, and the adapter frame 16 all in rigid unity with the vehicle chassis 18.

Distal portions 30 of the arm-like members 23 are keyed to shafts 31 which extend through the adjacent ends of the portions 25. The shafts 31 form the "elbow" joints of the arm-like members 23. Nuts 32 on the outer ends of the shafts 31 hold the portions 30 against the portions 25. At the other, or distal, ends, of the portions 30 are stub axles 33, upon which are mounted the flanged wheels 14, held thereon by nuts 34. Ridges 35 extend along the inner sides of each of the portions 30, and adjacent the shafts 31 they are engageable by either of two spaced stops 36 and 37 on the adjacent ends of each of the proximal portions 25. The function of the stops 36 and 37, in conjunction with the ridges 35 with which one of each pair of stops at a time may make contact, is to limit the angles of extension and flexion which the distal portions 30 may assume in relation to the proximal portions 25 of the arm-like members 23.

The shafts 31, extending through the joint-forming end of the arm portions 25 and 30, meet in approximate abutment in a tube 38, as shown in Fig. 2. The shafts 31 are provided with set-screws 39 which extend through slots 40 in the tube 38. This construction permits either shaft 31 to turn within the circumferential limits of the two slots 40, independently of the other shaft 31, and permits the same angular movement, magnified by the radius of the arm portions 30, to the wheels 14.

Collars 41 are affixed to the shafts 31 by set-screws 42. Coil springs 43 encompass the shafts 31 and have their one ends posited in holes 44 in the collars 41, and their other ends posited in holes 44 in the proximal arm portions 25. The springs 43 urge rotation of the shafts 31, and thereby extension of the distal arm portions 30 relatively to the proximal arm portions 25, to the limit permitted by the stops 37. The amount of spring tension is controlled by the position of the collars 41 on the shafts 31, and may be varied to suit the weight of the vehicle and riding conditions on the tracks of a railroad. As an approximation, the collars 41 may be set to give the extended wheels 14 loads of about 450 pounds for each front wheel and of about 350 pounds for each rear wheel, with the vehicle empty. The differential between the loading of front and rear wheels is, of course, to keep the flanged front wheels 14 well down on the rails to provide steering, and to leave ample load for traction on the conventional rubber-tired rear wheels 12 of the vehicle.

When raised from the rails 11, the flanged wheels 14 are suspended on hooks 46 attached to the adapter frame 16. As shown in Fig. 8, the hooks 46 are wired by springs 47 to extend outwardly to positions where they may engage holes 48 in the ridges 35 on the backs of the arm-portions 30. A wheel 49, having a square center hole 50 is suspended on brackets (not shown) mid-way between the sides of the vehicle, and is connected by rods 51 to the hooks 46. When a suitable tool is inserted in the hole 50 and the wheel 49 is rotated thereby, the rods 51 will pull both the hooks 46 from the holes 48 simultaneously, permitting the wheels 14 to fall upon the rails.

To move the arm-like members 23 when they have been released by the hooks 46, or to move them to positions where the hooks 46 may engage them, a lift bar 52 is inserted in either of holes 53 in the proximal arm portions 25, and is used as a lever to move the arm-portion in the desired direction.

In operation, the vehicle 10 is run upon the rails at a point, such as a railroad station, where the rails are inlaid into the surrounding ground, and the wheel 49 is rotated to withdraw the hooks 46 from the distal arm portions 30 and allow the wheels 14 to fall to the rails. As both the arm-like members 23 are keyed to the axle 22, both wheels will fall together when released. While the wheels are suspended, the springs 43 urge extension of the distal arm portions 30 to the limits permitted by the stops 37 and the ridges 35, and this extension will temporarily prevent the spring bolts 28 from entering the holes 29 and freezing the proximal arm portions 25 to the adapter frame 16. A lift bar 52 is then inserted in one of the holes 53 and is lifted to cause flexion of the arm-like members 23. The exerted force brings the holes 29 into register with the spring bolts 28, permitting the bolts to snap into the holes and lock the position of the proximal arm portions 25 in relation to the adpater frame 16 and the vehicle chassis 18. It also slightly tenses the springs 43, allowing the ridges 35 to move from the stops 37 to positions between the stops 37 and the stops 36. Thus the vehicle is spring-mounted upon the wheels 14. In the reverse operation of retracting the wheels, the lift bar 52 is again inserted in a hole 53 and is pushed down to permit the manual release of the spring-bolts 28 from the holes 29, and is then further pushed down to swing the distal arm portions 30 up to positions in which the hooks 46 grasp them and hold them. It is to be noted that in thus retracting the wheels there is no spring action to be overcome, and the leverage on the lift bar 52 is wholly applied to lifting the wheels.

The foregoing description is not to be construed as a limitation upon the invention, the scope of which is set forth in the appended claims.

I claim:

1. Conversion apparatus for enabling an automobile or like four-wheeled vehicle to run upon rails, comprising frame members attachable to the forward and rearward ends of said vehicle; arm-like members respective to each of the corners of said vehicle and each having a proximal portion and a distal portion pivotally connected, said proximal portion being pivotally secured to the frame member of the respective end of said vehicle; a flanged rail-engaging wheel rotatably mounted on each of said distal portions; locking means for temporarily securing the proximal portion of each of said arm-like members in fixed angular relationship to said vehicle; stop means limiting the angular relationship between the proximal portion and the distal portion of each arm-like member; and spring means urging the distal portion of each arm-like member to an extended position relative to the proximal portion of said member.

2. Conversion apparatus for enabling an automobile or like vehicle to run upon rails, comprising flanged wheels, arm-like members respective to each of said wheels having each a distal portion on which the respective wheel is rotatably mounted, and a proximal portion, said distal portion pivoting on said proximal portion, and said proximal portion being pivotally connected to a fixed point to said vehicle, said arm-like members moving in extension to swing said wheels downward and moving in flexion to swing said wheels upward, and springs acting between said distal portions and said proximal portions urging extension of said members.

3. Conversion apparatus for enabling an automobile or like vehicle to run upon rails comprising arm-like members mounted pivotally at each corner of said vehicle for movement in vertical planes, each of said members having proximal portions and distal portions, a pivot joint between each of said proximal portions and the respective distal portion, on which said distal portion pivots, said proximal portions being also pivotally connected to said vehicle, flanged wheels mounted on said distal portions, means for locking said proximal portions at fixed angles of downward extension relative to said vehicle, springs acting between said distal portions and points on said vehicle on the proximal side of said pivot joints and holding said distal portions and said flanged wheels extended, said springs having insufficient strength to sustain the whole weight of the vehicle upon the so-extended wheels, and means actuable when said arm-like members are flexed for engaging said arm-like members to hold said wheels suspended.

4. Conversion apparatus as set forth in claim 3, in which the distal portions of said arm-like members are secured to individual half-axles extending through the respective proximal portions, said springs connecting said half-axles and said proximal portions, and a member connecting the half-axles at the same end of said vehicle and capable of limited rotation with respect to each of the so-connected half-axles whereby the so-connected distal portions of said arm-like members have individual limited freedom of extension and flexion.

5. Conversion apparatus as set forth in claim 3, and stop means limiting the downward extension of said proximal portions to the fixed angles at which said means for locking are effective.

6. Conversion apparatus as set forth in claim 2 in which said vehicle also has rubber-tired wheels mounted thereunder in longitudinal alignment with said flanged wheels and extending below said flanged wheels when said arm-like members are flexed so as then wholly to support said vehicle and said springs are pre-loaded so as to partially support said vehicle upon said flanged wheels and partially upon said rubber-tired wheels when said arm-like members are extended.

References Cited in the file of this patent

UNITED STATES PATENTS

| | | |
|---|---|---|
| 1,446,784 | Carter | Feb. 27, 1923 |
| 1,973,494 | McCullough et al. | Sept. 11, 1934 |
| 2,021,075 | McGinness | Nov. 12, 1935 |
| 2,157,650 | Fildes | May 9, 1939 |
| 2,655,872 | Templeton | Oct. 20, 1953 |
| 2,655,873 | McDonald | Oct. 20, 1953 |

FOREIGN PATENTS

| | | |
|---|---|---|
| 1,109,517 | France | Sept. 28, 1955 |